Figure 2:
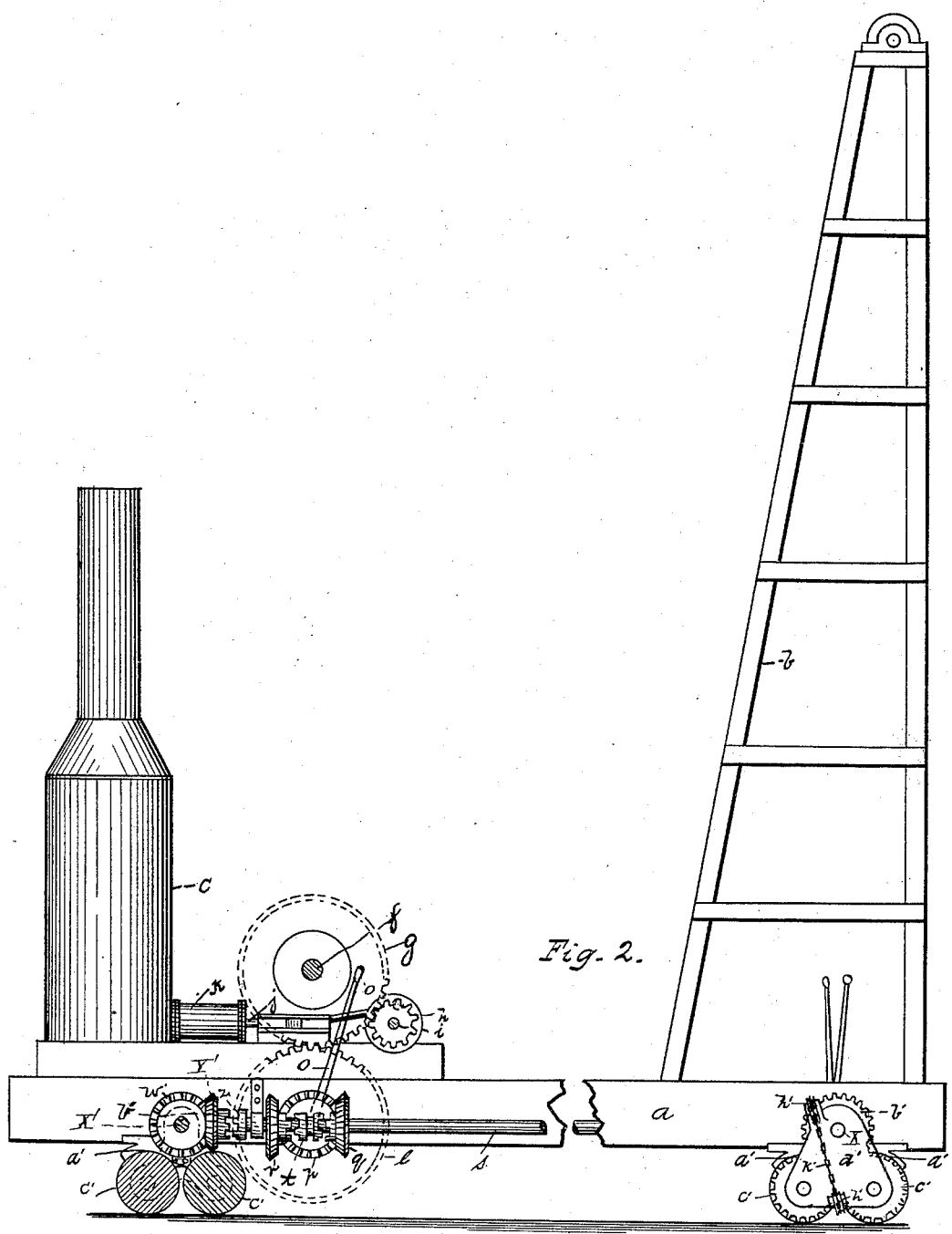

(No Model.) 2 Sheets—Sheet 1.
T. SMITH.
MOVABLE RIG OR DERRICK.
No. 474,463. Patented May 10, 1892.
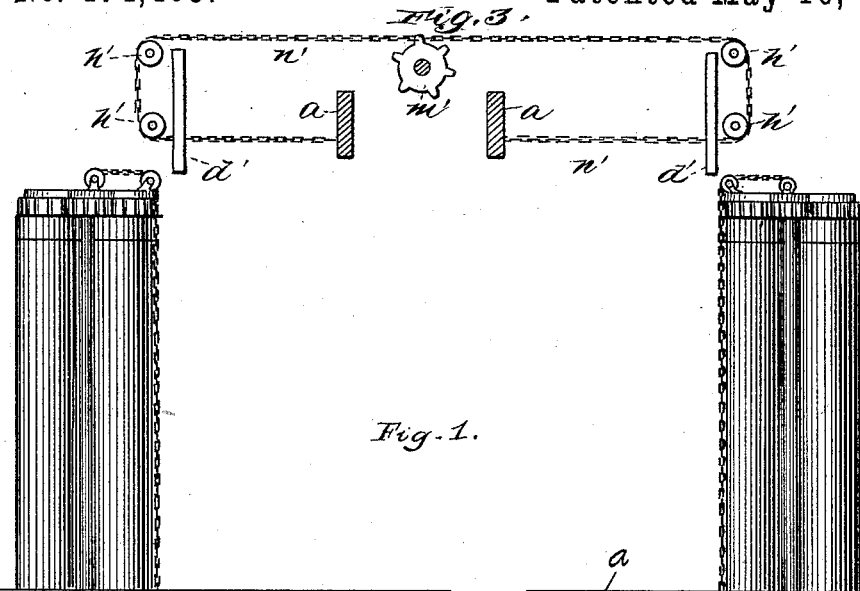
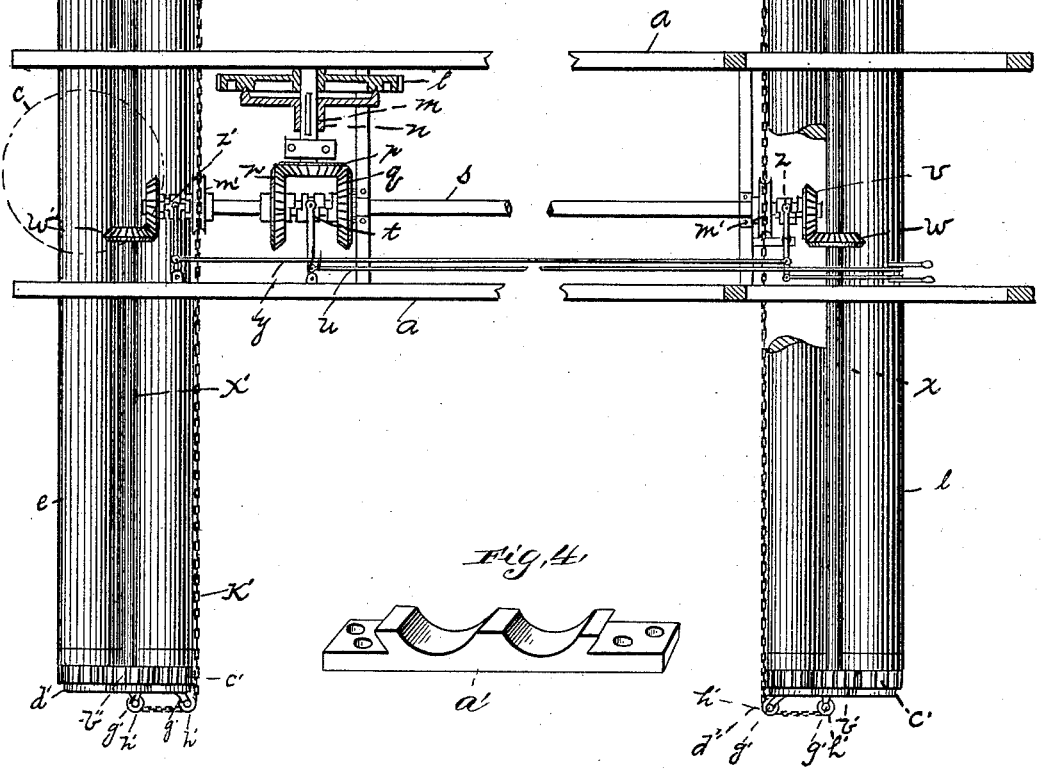
Witnesses:
Inventor.
Thomas Smith
per
John H. Roney
Attorney (No Model.) 2 Sheets—Sheet 2.
T. SMITH.
MOVABLE RIG OR DERRICK.

No. 474,463. Patented May 10, 1892.

UNITED STATES PATENT OFFICE.

THOMAS SMITH, OF ALLEGHENY, PENNSYLVANIA.

MOVABLE RIG OR DERRICK.

SPECIFICATION forming part of Letters Patent No. 474,463, dated May 10, 1892.

Application filed April 30, 1891. Serial No. 391,151. (No model.)

*To all whom it may concern:*

Be it known that I, THOMAS SMITH, a citizen of the United States, residing at Allegheny, in the county of Allegheny and State of Pennsylvania, have invented certain new and useful Improvements in Movable Rigs or Derricks; and I do hereby declare the following to be a full, clear, and exact description of the invention, such as will enable others skilled in the art to which it pertains to make and use the same, reference being had to the accompanying drawings, which form a part of this specification, in which—

Figure 1 indicates a plan view of my improved movable derrick. Fig. 2 indicates a side view of same, partly in section and partly in elevation. Fig. 3 is an end elevation, partly in section, showing sprocket-wheel in engagement with chain. Fig. 4 is an inverted perspective of one of the saddles.

The object of my invention is to produce a movable rig or derrick adapted to the use or support of a drop or pile-driver or analogous purpose. I accomplish this by the apparatus hereinafter specifically described, which consists of a platform slidably mounted on rollers and carrying a boiler, engine, and rig or pile-driving frame-work suitably secured thereon, and suitable mechanism to rotate said rollers, and means to cause said platform to slide or move laterally on said rollers, as hereinafter described.

I will now describe my invention, reference being had to the accompanying drawings, forming part hereof, in which like letters indicate like parts wherever they occur.

Referring to said drawings, $a$ is a frame of any desirable length and width, upon which are suitably mounted, respectively, the derrick $b$, boiler $c$, and engine. Upon the under side of the front and rear, respectively, said platform is provided with saddle-shaped bearings $a'$ $a'$, which are adapted to fit neatly over the propelling-rollers $e$ $e$ $e$ $e$.

$f$ is the power-shaft, and $g$ is a large spur-wheel thereon. Said spur-wheel meshes with and receives power from a small spur-wheel $h$, suitably secured upon a crank-shaft $i$, driven by the piston $j$, which operates in the cylinder $k$. Power is transmitted through said spur-wheel $g$ to a similar wheel $l$, which is loosely secured upon the transverse shaft $m$, which is suitably supported in the side of said frame. Said idler $l$ is adapted to be converted into a driving-wheel by being rigidly secured upon said shaft $m$ by the clutch $n$, which is suitably secured upon said shaft and is adapted to be operated by the lever $o$. Upon the inner end of said shaft $m$ is suitably secured the beveled gear-wheel $p$, which meshes with and communicates power to the beveled gear-wheels $q$ and $r$, loosely secured upon the long horizontal shaft $s$, accordingly as the double clutch $t$, suitably secured between said wheels, is thrown into or out of gear therewith, respectively, by operating the lever $u$. Upon the outer ends, respectively, of said shaft $s$ are loosely secured the miter-wheels $v$ and $v'$, which mesh with and transmit power to similar wheels $w$ and $w'$, which are suitably secured upon the long transverse shafts $x$ and $x'$, respectively, accordingly as either wheel $v$ or $v'$ is thrown in or out of clutch by operating the lever $y$, which controls, respectively, the clutches $z$ and $z'$, which are suitably secured upon said shaft $s$. The extreme outer ends of said shafts $x$ $x'$ are respectively provided with spur-wheels $b'$ $b''$, which mesh with and communicate power to the spur-wheels $c'$ $c'$ $c'$ $c'$, which are suitably secured upon the outer ends of said propelling-rollers $e$ $e$ $e$ $e$, the ends of said shafts and rollers being secured together by the plates $d'$ $d'$, in which are formed bearings for the spur-wheels upon the ends of said shafts $xx'$ and rollers $e$ $e$, respectively. Upon the outer surface of said plates, at the top and bottom of the same, are secured bearings $g'$ $g'$ for the small pulleys $h'$ $h'$, which guide the endless chains $k'$ $k'$, the inner ends of which are attached to the outer sides of said frame and adapted to operate over the sprocket-wheels $m'$ $m'$, which are loosely secured upon said shaft $s$ near the ends thereof, whereby said frame or platform is caused to move laterally in either direction, accordingly as said wheels are operated, said sprocket-wheels being adapted to be rigidly secured thereon by the clutches $z$ $z'$, controlled by the lever $y$.

Having described my invention, what I claim, and desire to secure by Letters Patent, is—

1. In a movable rig or pile-driving frame-work, the combination of the rollers, means to rotate said rollers, a platform slidably mounted on said rollers, and means to slide or move said platform laterally thereon, substantially as and for the purpose herein set forth.

2. In a movable rig or pile-driving framework, the combination of the rollers, means to rotate said rollers, a platform slidably mounted on said rollers, means to slide or move said platform laterally thereon, and a vertical rig or frame-work mounted on said platform, substantially as herein set forth.

3. In a movable pile-driving frame-work, the combination of the rollers having spur-wheels at the ends thereof, the platform slidably mounted thereon, a longitudinally-extending shaft having a beveled gear-wheel at each end, transverse shafts, each having a central gear-wheel meshing with the said beveled wheels and also having spur-wheels meshing with said roller spur-wheels, an endless chain, a sprocket-wheel gearing with said chain, and means for operatively connecting said wheel with the longitudinal shaft, whereby said frame or platform may be moved sidewise upon said rollers, substantially as described.

In testimony that I claim the foregoing I hereunto affix my signature this 20th day of April, A. D. 1891.

THOMAS SMITH. [L. S.]

In presence of—
CHARLES LARGE,
JNO. H. RONEY.